United States Patent [19]
Peterson

[11] Patent Number: 5,144,764
[45] Date of Patent: Sep. 8, 1992

[54] DECOY WITH WIND-ACTUATED WINGS

[76] Inventor: Timothy D. Peterson, 2071 Carroll Ave., St. Paul, Minn. 55104

[21] Appl. No.: 711,593

[22] Filed: Jun. 6, 1991

Related U.S. Application Data

[63] Continuation of Ser. No. 561,702, Aug. 2, 1990, abandoned.

[51] Int. Cl.⁵ .............................................. A01M 31/06
[52] U.S. Cl. .......................................................... 43/3
[58] Field of Search ........................................ 43/2, 3

[56] References Cited

U.S. PATENT DOCUMENTS

| | | |
|---|---|---|
| 1,666,543 | 1/1928 | Vincent . |
| 2,413,418 | 12/1946 | Rulison . |
| 2,441,753 | 5/1948 | Carpenter . |
| 3,435,550 | 4/1969 | Carlson ..................... 43/3 |
| 3,800,457 | 7/1974 | Barrett . |
| 4,062,141 | 12/1977 | Shjeflo ..................... 43/3 |
| 4,611,421 | 9/1986 | Jacob ........................ 43/3 |
| 4,651,457 | 3/1987 | Nelson ...................... 43/3 |

Primary Examiner—Kurt Rowan
Attorney, Agent, or Firm—Fredrikson & Byron

[57] ABSTRACT

The present invention provides a decoy with a pair of flexible wings and a body which includes means for orienting the decoy into the wind. The wings are flexibly mounted to the body and fluctuate in response to air flow over the wing between a lower position wherein the wings define airfoils which generate lift and an upper position wherein the wings are oriented in a stall configuration causing the wings to fall.

11 Claims, 4 Drawing Sheets

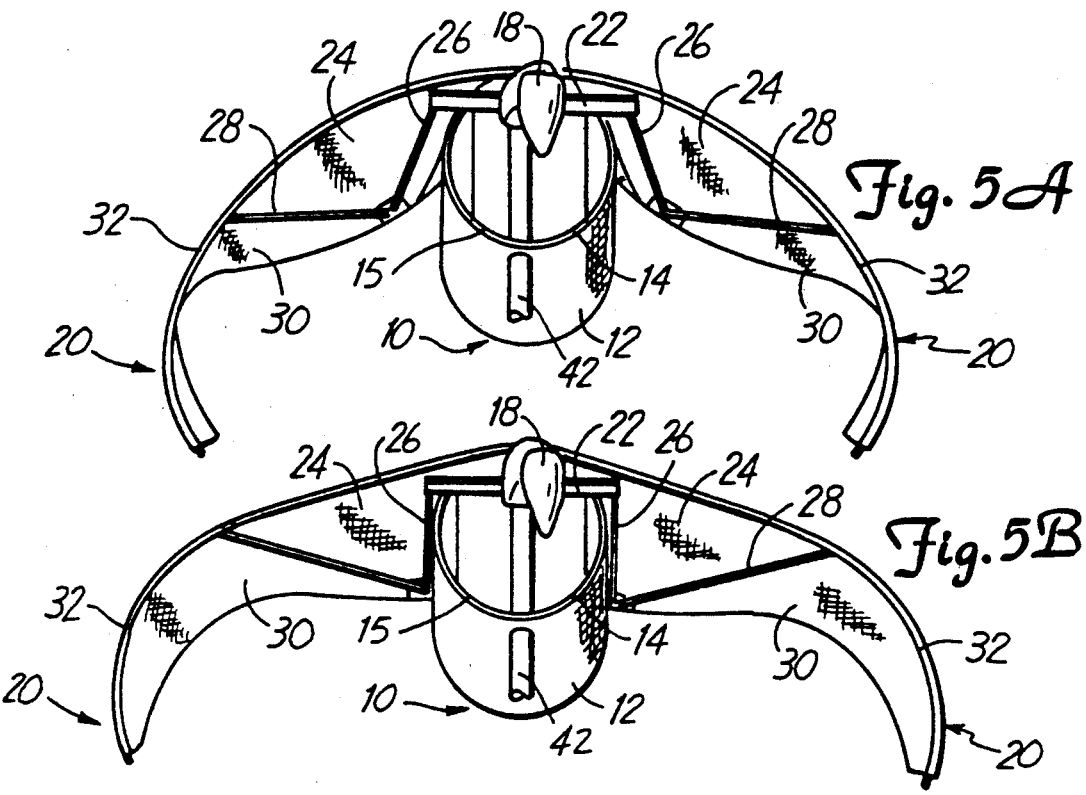
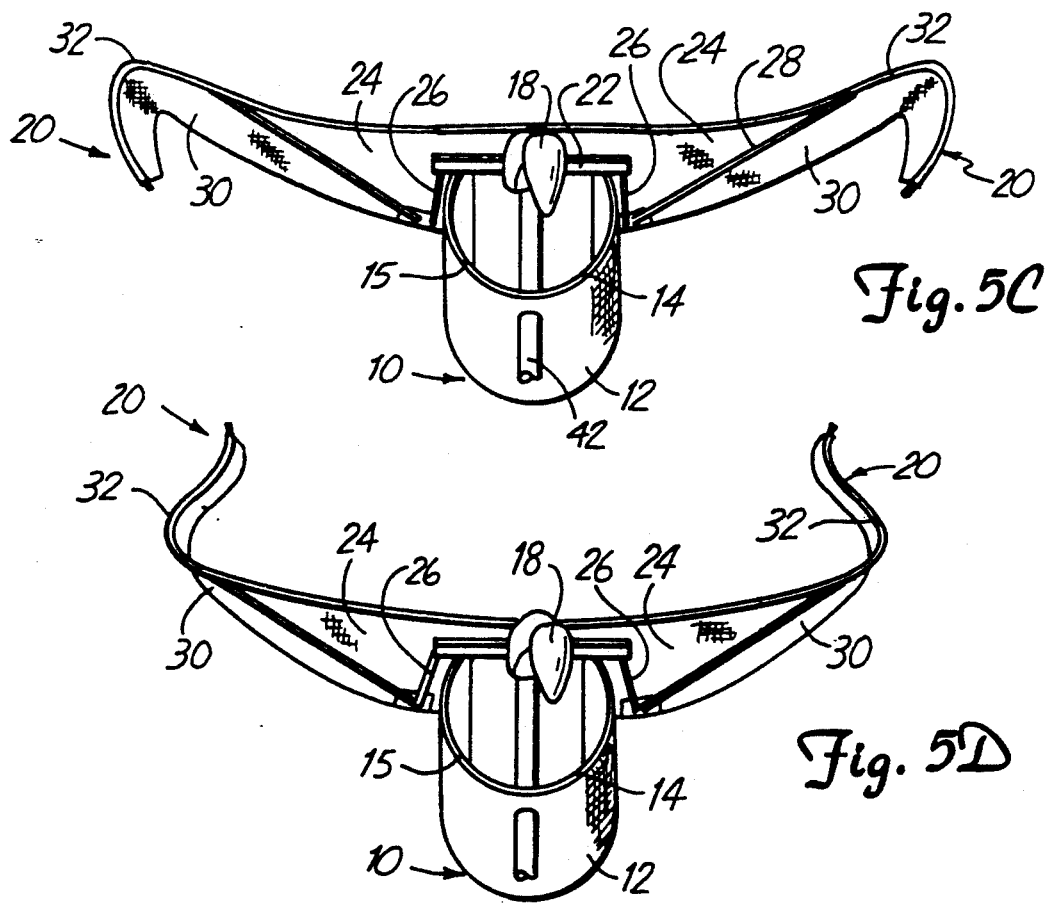

DECOY WITH WIND-ACTUATED WINGS

This application is a continuation of application Ser. No. 561,702, filed Aug. 2, 1990, now abandoned.

FIELD OF THE INVENTION

This invention relates to decoys for attracting fowl, such as those used when hunting ducks or geese.

BACKGROUND OF THE INVENTION

Hunters often use decoys when hunting fowl. These decoys are generally shaped in the image of a game bird such as a duck or a goose, and are placed on the ground or water near the hunter.

Most of the decoy designs which are commercially available are stiff wooden or plastic models designed for floating on a body of water. Once placed on the water, they remain lifeless and move primarily in response to waves on the water. It is well established that birds such as ducks and geese orient their bodies so that they face into the wind, but these standard floating decoys do not turn into the wind.

The attention of birds passing overhead is believed more readily drawn to a moving, animated figure than to a stiff representation of a duck or a goose. An animated decoy would therefore be more effective. Some efforts along this line have involved decoys provided with a flapping wing motion by mechanical means. These decoys use wave action, wind, or manual actuation to drive the wings and include mechanical means, such as levers and springs, which act against the driving force to produce oscillating movement. For instance, U S. Pat. No. 3,435,550 teaches a decoy which includes wing members stiffly mounted on the body. The wings have a central rod which may be bent by a gust of wind and, when the wind dissipates, the rod urges the wings back into their initial configuration. This process continues as long as the wind speed varies, producing a faltering flapping motion. However, if the wind force remains relatively constant, the wings remain bent in an equilibrium position. Fowl hunting decoys which do incorporate flapping wings generally do not include means for orienting the decoys into the wind. This would appear to cause unnatural, unbalanced air flow over the wings of the decoy to result in an uneven flapping motion. Accordingly, it would be desirable to provide a decoy with life like wing motions which also includes means for directing the decoy into the wind.

SUMMARY OF THE INVENTION

The present invention provides a decoy with a pair of flexible wings and a body which includes means for orienting the decoy into the wind. The wings are flexibly mounted to the body and fluctuate between lower and upper positions in response to air flow over the decoy. Each of the wings includes a portion adjacent the body of decreased flexibility which gives the wing an airfoil shape in its lower position. As air flows over the wing in its lower airfoil orientation, it provides lift to the wing. As the wing lifts, however, the airfoil orientation to the wind decreases until, when the wing reaches its upper position, the wing stalls and falls back toward its lower position, whereupon the process is repeated to provide a flapping motion.

BRIEF DESCRIPTION OF THE DRAWINGS

FIGS. 5A-D are front views of the decoy of FIG. 1 illustrating the movement of the wings of the decoy in response to wind flow.

DESCRIPTION OF THE PREFERRED EMBODIMENTS

Figure 1:
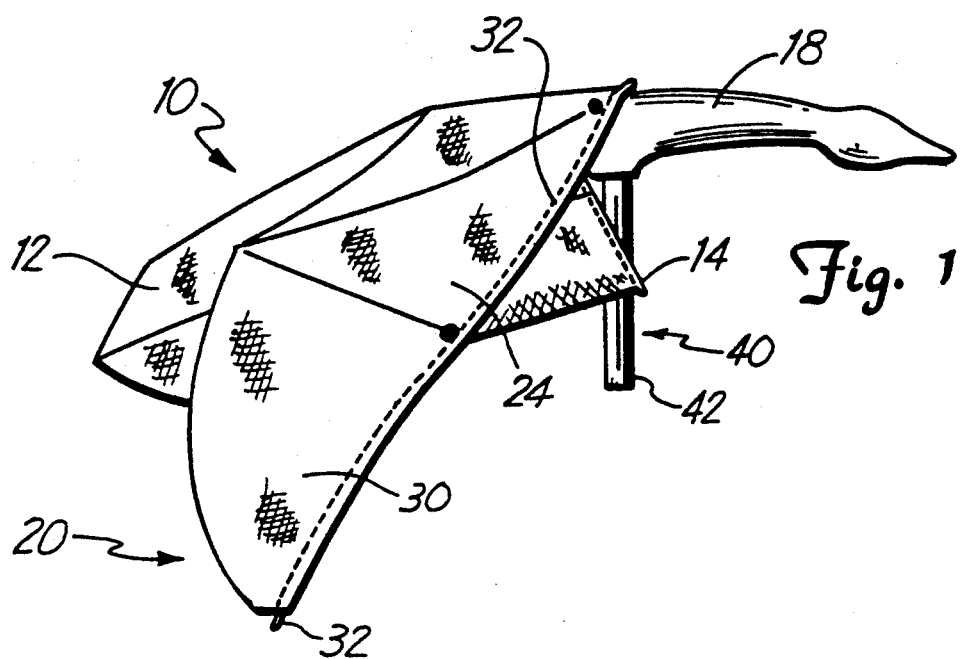
FIG. 1 is a side elevational view of a decoy according to the invention.
Figure 2:
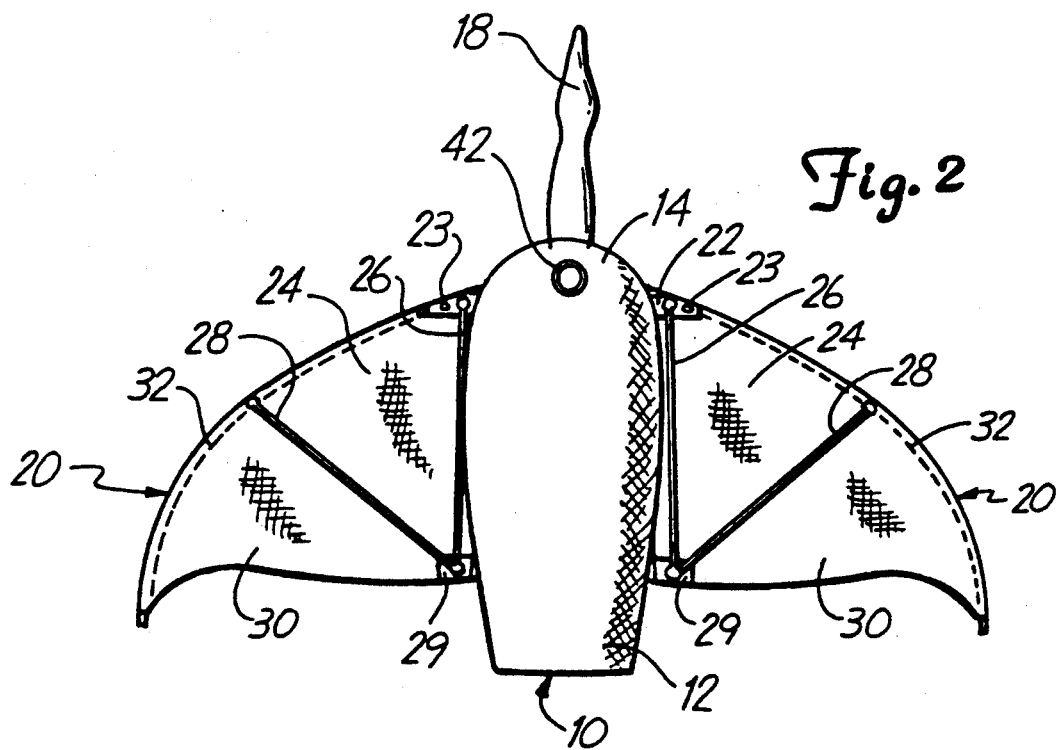
FIG. 2 is a bottom elevational view of the decoy of FIG. 1.
Figure 3:
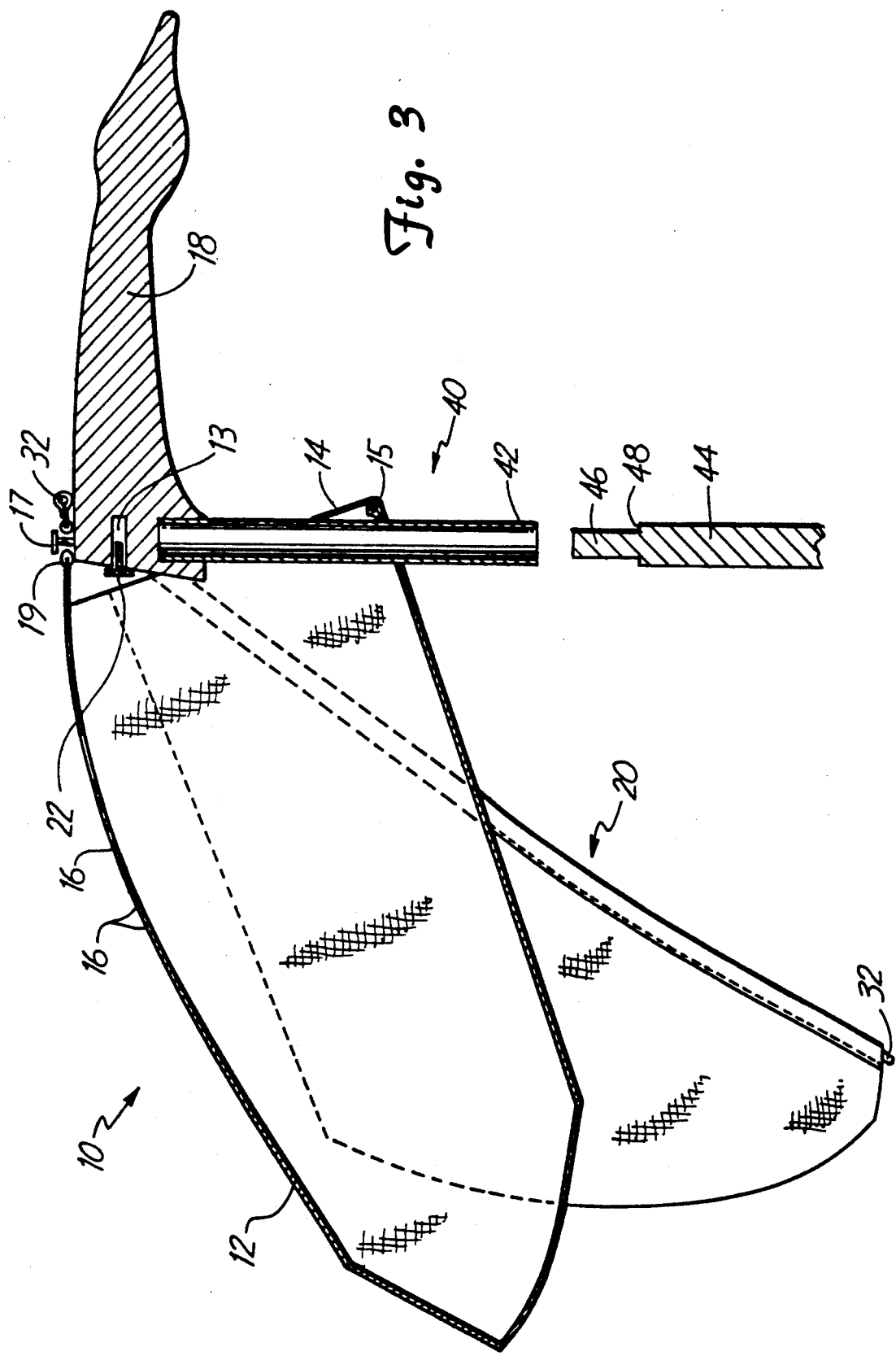
FIG. 3 is a cross sectional view of the decoy of FIG. 1.

As shown in FIG. 1-3, a decoy according to the present invention includes a centrally located body 10 with one wing 20 disposed on either side of the body. At least a portion of the body of the decoy comprises a wind sock 12 of fabric or other sheet material with a generally cylindrical shape. Desirably, the wind sock is not perfectly cylindrical, but rather is shaped to more closely resemble the body portion of an actual bird. For example, the wind sock may generally taper inwardly in a rearward direction, as best seen in FIG. 2. At its forward end, the wind sock has a forwardly-open mouth 14 through which a stream of air may enter. The mouth preferably includes a structural member 15 (best seen in FIG. 3) to define its shape. This structural member may, for example, comprise a wire cable carried immediately adjacent the forward end or rim of the wind sock. In a preferred embodiment, the structural member 15 is arcuately shaped and is attached at either end adjacent a rigid mounting bar 22 which forms a chord across the generally circular mouth 14.

In order to ensure that wind flow into the wind sock 12 is not obstructed by the wings as they flap, the bottom portion of the mouth is desirably carried forwardly of the upper portion of the mouth such that the mouth is angularly displaced from a truly vertical orientation. In a preferred embodiment, this is accomplished by passing a generally vertical support member or post 40 through a portion of the wind sock and placing the bottom of the structural member 15 on the forward side of support member 40 while the upper portion is spaced slightly rearwardly of the support member. This also biases the wind sock toward an attitude sloping generally downwardly in a rearward direction, imitating a "feet down" position of a landing bird. If so desired, the wind sock may include a plurality of small vents (16 in FIG. 3) to allow a portion of the air entering the wind sock to escape, thereby reducing the stress on the wind sock without significantly reducing the drag which the wind sock produces.

The body 10 of the decoy desirably also includes a forward "head" portion 18 which is shaped to resemble at least the head of a game fowl. In a preferred embodiment, this forward portion represents the head and the neck of such a bird. The wind sock may be attached to the head portion by any desired means. In a preferred embodiment, an eyelet 19 defines an aperture through the upper, forward portion of the fabric of the wind sock and mates with an attachment pin 17 provided on the upper surface of the head portion. The attachment may be further enforced by providing the head portion with a horizontal channel 13 for receiving a portion of the mounting bar 22, which may be affixed to either the wind sock or the wings of the decoy, such as by rivets 23. The head portion may be permanently affixed to the support member 40 such that the support member extends downwardly from this forward portion 18 and through a portion of the wind sock, as described above.

In a preferred embodiment, the head portion is removably attached to the wind sock, rather than being permanently affixed thereto. In this manner, one may disassemble the decoy by removing the relatively rigid head portion 18 and support member 40 from the rest of the decoy, which is desirably very flexible. Such a construction will facilitate easy storage and transportation of the decoy by allowing it to be broken into two component parts.

Desirably, both the body and the wings of a decoy according to the present invention are formed of a thin flexible material, such as a tear-resistant cloth like Tyvek TM (a spun olefin fabric). In a particularly preferred embodiment, both of the wings and at least a portion of the wind sock 12 of the body are formed of a single, unitary piece of such a fabric. For instance, both wings and the upper half of the wind sock may be cut from one piece of fabric and the bottom half of the wind sock may be cut separately and sewn to the upper half. Instead, if desired, the wind sock may be formed from one piece of fabric and two pieces may be individually cut in an appropriate shape to form the wings. These wings may then be sewn onto the wind sock to produce the decoy.

Each wing has a very flexible outer portion 30 disposed away from the body of the decoy and a generally triangularly shaped less flexible inner portion 24 carried adjacent the body. The inner portion is defined on two sides by first and second struts 26 and 28, respectively. Each wing also desirably includes a flexible steel cable 32 or the like carried along the forward edge of the wing. A single cable extending from the tip of one wing to the tip of the other wing may be employed rather than using two independent cables. In addition to defining the third side of the less flexible portion 24 of the wing, the cable has sufficient stiffness to provide the outer portion 30 of the wings with a loosely defined preferred structural configuration (shown in FIG. 5A). The first end of each strut 26 is attached to the wing adjacent the cable at a position disposed away from the first end of the other strut 28 and the second end is attached at a location near the rear edge of the wing at or adjacent the attachment of the second end of the other strut to the wing. Thus, in a preferred embodiment, each wing includes a pair of stiff, supporting struts spaced from one another at their forward ends but converging rearwardly for attachment to the wings' rear edge.

Figure 4:
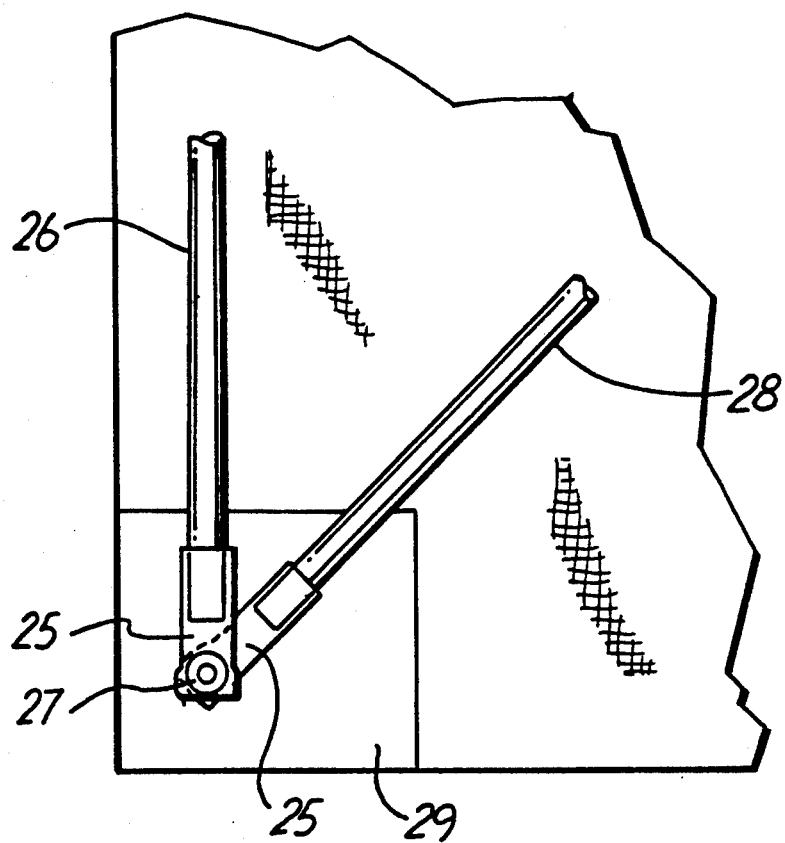
FIG. 4 is a detail view showing a preferred embodiment of the connection of struts in a wing of the decoy of FIG. 1.

In a preferred embodiment, the first end of the first strut is flexibly attached to the mounting bar 22 adjacent an end thereof and the second end of both struts are flexibly attached to one another as well as to the wing, as shown in FIG. 4. As best seen in that figure, a flexible attachment may be produced by providing each strut with a flexible end connector 25, which may be a short piece of flexible acrylic tubing or the like within which the strut end is removably received, and passing a rivet 27 through both end connectors and the fabric of the wing. If so desired, a small piece of reinforcing fabric 29 may also be included to provide additional strength to the fabric at this junction. The first end of each of the struts may also be attached to the rest of the decoy by such a rivet and end connector combination, and this construction is preferred for the first end of the first strut 26 to ensure that the connection between the wing and the body of the decoy is sufficiently flexible to allow the desired flapping motion. The struts may be formed of any desired material, but a rigid, light weight material, such as a fiberglass rod, is preferred.

In order to ensure proper air flow beneath the wings, the decoy should be held at a position elevated above the ground by a support member 40. The support member may take any desired shape, but it should allow the decoy to pivot with respect to the ground in response to changing wind direction. A preferred configuration of such a support member is shown in FIG. 3. This support member has an upper segment 42 and a lower segment 44. At least a portion of the upper segment comprises a hollow tube for rotatably receiving a mating portion 46 of the lower segment. The upper segment 42 may rest upon an annular shoulder 48 of the lower segment. As a breeze blows over the decoy, the wind sock is inflated and urges the decoy to turn about the lower segment 44 of the support member until the mouth 14 of the wind sock is oriented into the wind. This ensures that the decoy will be oriented with its head facing the wind, much like a natural bird.

The proportions of a decoy of the invention may be chosen as desired. For example, in a preferred embodiment, the wind sock is approximately 18 inches in length, while the forward portion 18 is about 14 inches, yielding a central body 10 of about 32 inches. The wing span, as measured from the tip of one wing to the other, is about 48 inches, and the leading edge of each wing is about 21 inches from its tip to its first cable's 26 attachment to the mounting bar 22. Although the relative sizes of the inner and outer portions (24 and 30, respectively) of the wing may be varied to produce differing wing responses to wind, one embodiment which has been found to produce particularly good results has a space of about 9 inches between the first ends of the struts 26, 28, about 12 inches from the first end of the second strut 28 to the tip of the wing, and about 17 inches from the tip to the junction of the second ends of both struts adjacent the trailing edge of the wing.

FIGS. 5A-D depict the movement of the wings 20 in response to air flow thereover. In their lower position, shown in FIG. 5A, the wings hang generally downwardly. The inner, flexible portion 24 of the wings hold the wings outwardly from the body and the cable 32 prevents the outer portions 30 from simply hanging, giving the wings a generally arcuate shape, as shown. The struts 26,28 hold the inner portion 24 in a position angled generally downwardly in a rearward direction. This configures a significant portion of the upper surface area of this part of the wing into a forwardly oriented airfoil shape which provides lift to the wings, causing them to move generally upwardly about a pivot axis defined generally by the strut 26.

As shown in FIGS. 5B and C, the wings pivot with respect to the body primarily about the point at which the first strut 26 is connected to the mounting bar 22. The rearward segment of the inner portion 24 of the wing is lifted more rapidly than the area closer to the leading edge of the wing. Hence, as the wings move upwardly, the airfoil shape of the upper wing surface is lost. At an upper position (shown in FIG. 5D) wherein the wing's inner portion 24 achieves a generally horizontal orientation, the wing stalls and begins to fall back toward the lower position.

The more flexible outer portion 30 of the wing will tend to continue to move generally upwardly, though, as shown. The inner portion 24 of the wing will therefore return to the position shown in FIG. 5A more quickly than will the outer portion 30. However, sufficient lift to raise the wing is not generated until the entire wing substantially returns to this lower position. Since the wing does not gain much lift until the airfoil is re-established, this precludes stabilization of the wing in an equilibrium position between its lower and upper positions, even in the face of a steady wind. Accordingly, the wing will continue to fluctuate in this simulated flapping motion in both varying and constant winds.

FIGS. 5A-D also demonstrate the life-like motion produced by a decoy of the present invention. The wind sock 12 ensures that the decoy will face into the wind, just as a real bird does. Also, the flow of the flexible wings more closely approximates the graceful motions of a landing bird than a rigid, mechanically biased wing.

While a preferred embodiment of the present invention has been described, it should be understood that various changes, adaptations and modifications may be made therein without departing from the spirit of the invention and the scope of the appended claims.

I claim:

1. A decoy having a flapping wing action to attract fowl, comprising:
   an elongate body, including means for orienting the body into the wind;
   a pair of flexible wings; and
   mounting means joining each wing to the body and permitting each wing to move with respect to the body between lower and upper positions such that the wing in its lower position defines an airfoil shape which generates lift as air passes thereover to raise the wing, the air foil shape of the wing being lost as the wing is raised until the wing reaches its upper position, the wing in its upper position being oriented in a stall configuration causing the wing to fall, whereby said wings oscillate in a flapping motion between the lower and upper positions in response to air flow.

2. The decoy of claim 1 further comprising support means for supporting the decoy above ground level.

3. The decoy of claim 2 wherein the support means comprises an upper segment and a lower segment, the upper segment extending downwardly from the body and being rotatably attached to the lower segment.

4. The decoy of claim 1 wherein the body has forward and rearward ends and the means for orienting the body comprises a wind sock having an opening facing toward the forward end of the body.

5. The decoy of claim 1 wherein the body includes a forward member representing at least the head portion of a bird.

6. The decoy of claim 1 wherein both of the wings are formed from a unitary piece of a thin flexible material.

7. The decoy of claim 1 wherein both of the wings and at least a portion of the body are formed from a unitary piece of a thin flexible material.

8. The decoy of claim 1 wherein each wing comprises a relatively more flexible portion disposed generally away from the body and a relatively more rigid portion disposed nearer the body, the more rigid portion tapering generally downwardly and rearwardly away from the forward edge of the wing when the wing is in its lower position to define an airfoil shape.

9. A decoy having a flapping wing action to attract fowl, comprising:
   an elongate body having forward and rearward ends, the body including a windsock having an opening facing toward the forward end of the body, a bottom portion of the windsock being positioned forwardly of an upper portion of the opening;
   a pair of flexible wings; and
   mounting means joining each wing to the body and permitting each wing to move with respect to the body between lower and upper positions, the wing in its lower position defining an airfoil which generates lift as air passes thereover to raise the wing, and the wing in its upper position being oriented in a stall configuration causing the wing to fall, whereby said wings oscillate in a flapping motion between the lower and upper positions in response to air flow.

10. A decoy having a flapping wing action to attract fowl, comprising:
    an elongate body, including means for orienting the body into the wind;
    a pair of flexible wings having forward edges, a cable being carried adjacent the forward edge of the wings which extends from a position adjacent a tip of one wing to a position adjacent a tip of the other wing.

11. A decoy having a flapping wing action to attract fowl, comprising:
    an elongate body, including means for orienting the body into the wind;
    a pair of flexible wings, each wing comprising a relatively more flexible portion disposed generally away from the body and a relatively more rigid portion disposed nearer the body, the more rigid portion tapering generally downwardly and rearwardly away from the forward edge of the wing when the wing is in its lower position to define an airfoil shape, the more rigid portion being defined by a cable carried adjacent the forward edge of the wing and first and second struts, each strut including forward and rearward ends an being attached at its forward end adjacent the forward edge of the wing at a position disposed generally away from the other strut and being attached to the wing at its rearward end at a position adjacent the rearward end of the other strut.

* * * * *